Patented Sept. 8, 1925.

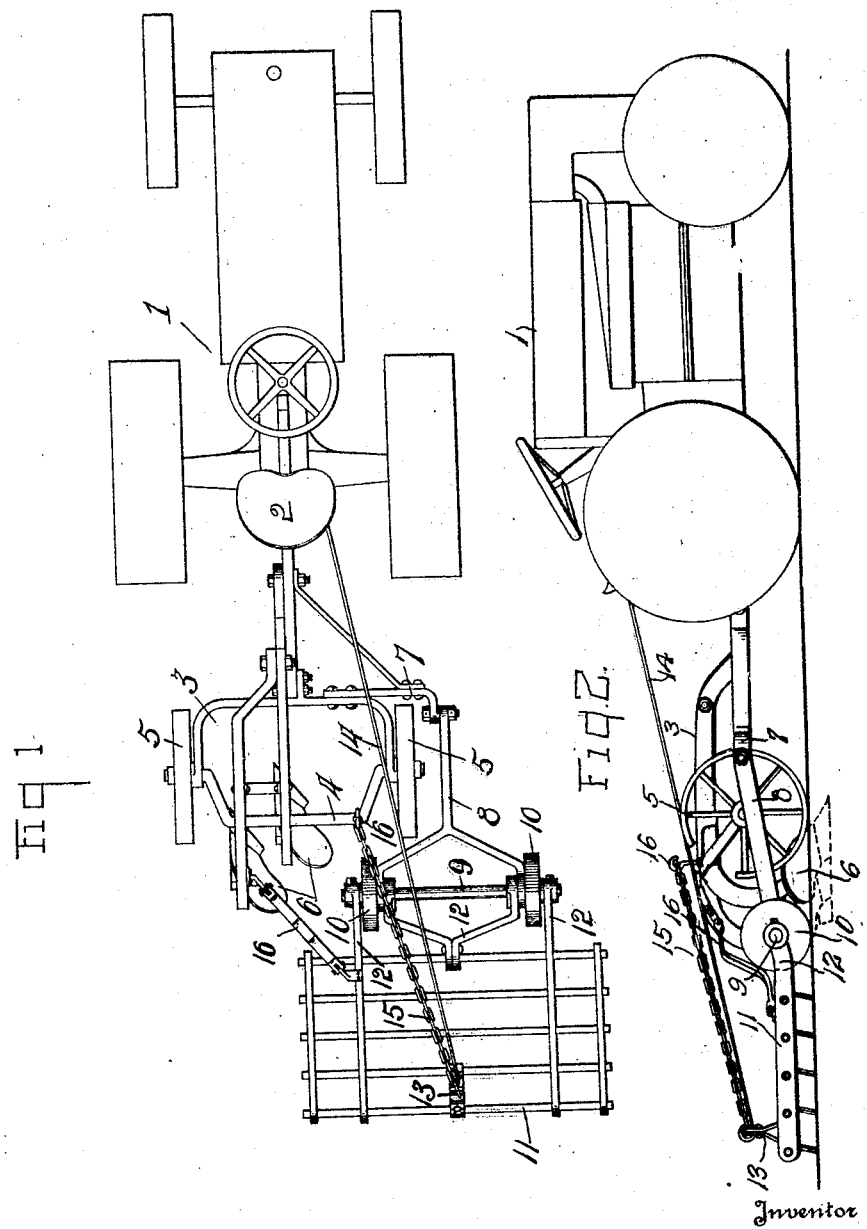

1,552,426

UNITED STATES PATENT OFFICE.

OLLIE J. FALL, OF TOLEDO, OHIO.

HARROW ATTACHMENT AND CONTROL.

Application filed June 23, 1924. Serial No. 721,635.

*To all whom it may concern:*

Be it known that I, OLLIE J. FALL, a citizen of the United States, and a resident of Toledo, in the county of Lucas and State of Ohio, have invented a new and useful Harrow Attachment and Control, which invention is fully set forth in the following specification.

The object of the invention is the provision of an attachment of this character which is mounted and controlled in such manner that it can be easily and quickly raised by the operator without leaving his seat on the associated tractor or other draft means and during movement thereof.

Another object of the invention is the provision, in combination with a plow of the sulky or wheeled type having an axle with a crank or offset portion connected to the plows and operable to raise or lower the same, or a trailing harrow attachment having harrowing means connected to said axle and adapted to be raised and lowered by plow raising and lowering movements of the axle.

The invention is fully described in the following specification, and one embodiment thereof illustrated in the accompanying drawings, in which,—

Figure 1 is a plan view of a tractor and connected plow with a harrow embodying the invention attached thereto, and Fig. 2 is a side elevation thereof.

Referring to the drawings, 1 designates a tractor having an operator's seat 2 thereon, and 3 a plow of the wheel type trailing from the tractor. This plow has an axle 4 supported at its ends by wheels 5 and having its central portion of crank or offset form to adapt the plow 6 attached thereto to be raised or lowered by turning movements of the axle, which may be controlled in any suitable manner, as well understood in the art.

The plow frame has an arm 7 projecting laterally from one side thereof in advance of the right-hand wheel 5, and pivotally trailing from this arm is a Y-shaped draft member 8, the forked end of which is engaged to an axle 9 at opposite sides of its center, and supporting wheels 10 are carried by the axle without said member. A toothed harrow 11 trails from the axle 9 and is connected thereto by a plurality of forwardly projecting arms 12, which are rigid with respect to the harrow and are adapted to permit the harrow to have vertical rocking or adjusting movements about the axle 9 as a pivot.

The standard 13 projects up from the rear edge portion of the harrow, centrally of its ends, and a control member 14 extends forward therefrom to a point adjacent to the driver's seat 2 to enable the operator, by a pull on said member, to effect a raising of the harrow to inoperative position about the axle 9, which, with its wheels 10, then serve as a carrying truck for the harrow. It is evident that the operator may apply power directly to the member 14 or indirectly thereto, as through a control lever.

The standard 13 is also connected by a chain or other suitable draft member 15 to the offset portion of the plow axle 4, in the present instance, to an arm 16 projecting upward from the axle, so that an upward and forward movement of said portion of the axle to effect a lifting of the plow 6 from the soil will also draw the chain 15 forward and raise the harrow. This, therefore, provides an automatic control for the harrow so that it is only down in operative position when the plows are in operative position. A link 16 connects the harrow frame and plow frame to permit relative lateral swinging thereof.

I wish it understood that my invention is not limited to any specific construction, arrangement or form of the parts, as it is capable of numerous modifications and changes without departing from the spirit of the claims.

Having thus described my invention what I claim as new and desire to secure by Letters Patent is:

1. In combination with a tractor, a plow frame connected thereto and having a wheel-provided crank axle, an arm extended upwardly from the arch of said axle, a substantially Y-shaped draft member having its stem pivoted to said frame, a wheeled axle connected to the forks of the draft member, a harrow, a series of arms carried by the harrow and pivoted to the axle of the draft member for vertical movements, a standard extended upwardly from the rear portion of the harrow, an operating member connected to the standard and operable from the tractor, and a connection between the standard and the arm of the cranked axle.

2. In combination with a tractor, a wheeled plow frame, a plow movably carried by the frame, a harrow, means movably connecting the harrow to the plow frame, means operable from the tractor to raise or lower the harrow, and a connection between the harrow and plow carrying means for permitting simultaneous raising or lowering of the plow and harrow, said connection being formed so as to permit raising or lowering of the harrow without affecting the plow.

3. In combination with a tractor and a plow frame connected thereto and having a wheel provided crank axle, a wheeled draft member connected to the plow frame, a harrow pivotally connected to the draft member, means operable from the tractor to raise or lower the harrow, and a flexible connection between the harrow and crank axle to permit simultaneous raising or lowering of the harrow and the plow and to permit the harrow to be raised or lowered without affecting the plow.

4. In combination with a tractor, a wheeled plow frame, a plow movably carried by the frame, a wheeled draft member connected to the plow frame, a harrow connected to the draft member so as to be capable of being raised or lowered relative thereto, means operable from the tractor to raise or lower the harrow, and means connected to the harrow and to the plow carrying means for permitting simultaneous raising or lowering of the plow and harrow, said connecting means being formed so as to permit raising or lowering of the harrow without affecting the plow.

In testimony whereof, I have hereunto signed my name to this specification.

OLLIE J. FALL.